No. 841,090. PATENTED JAN. 8, 1907.
J. A. KAPLAN.
PULLEY AND BUSHING.
APPLICATION FILED MAR. 5, 1906.
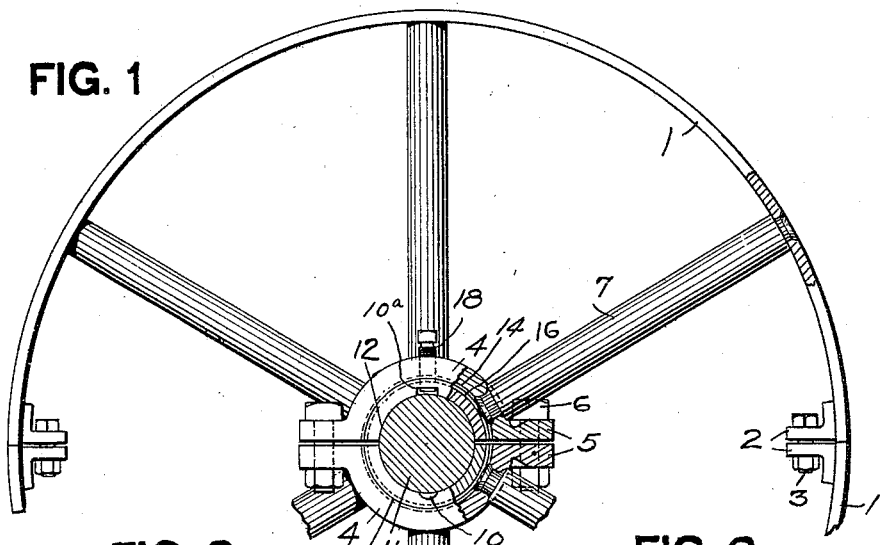
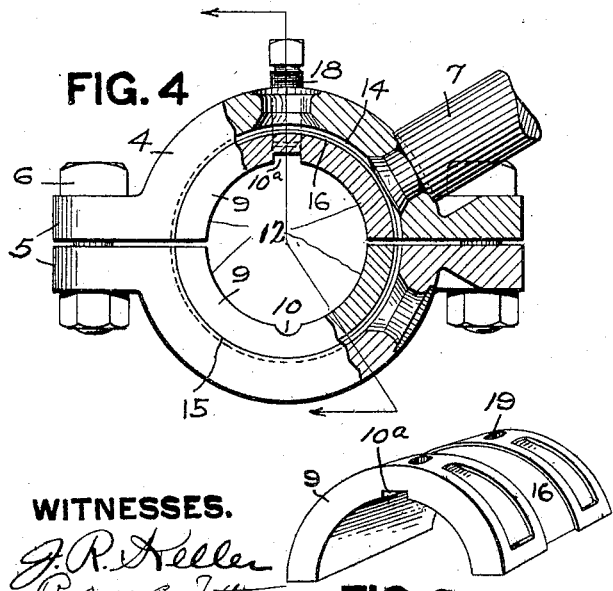
WITNESSES. INVENTOR.

UNITED STATES PATENT OFFICE.

JOSEPH A. KAPLAN, OF PITTSBURG, PENNSYLVANIA, ASSIGNOR TO JOSHUA RHODES, OF ALLEGHENY, PENNSYLVANIA, AND WILLIAM H. LATSHAW, OF PITTSBURG, PENNSYLVANIA.

PULLEY AND BUSHING.

No. 841,090.  Specification of Letters Patent.  Patented Jan. 8, 1907.

Application filed March 5, 1906. Serial No. 304,290.

*To all whom it may concern:*

Be it known that I, JOSEPH A. KAPLAN, a resident of Pittsburg, in the county of Allegheny and State of Pennsylvania, have invented a new and useful Improvement in Pulleys and Bushings; and I do hereby declare the following to be a full, clear, and exact description thereof.

This invention relates to sectional pulleys and bushings therefor.

The object is to provide a pulley and bushing which will insure the pulley being clamped firmly to the shaft, so as to dispense with keyways and set-screws, if necessary, and which will prevent the pulleys from wabbling on the shaft.

It is the general custom to provide pulleys with bushings of varying thicknesses, so that the pulleys can be adapted to shafts of various sizes. Heretofore such bushings have been semitubular sections with walls of substantially uniform thickness, and the pulley-hub has bearing over the entire surface of the bushing. The clamping of the pulley-hub onto the bushings presses the latter against the shaft, but with substantially uniform pressure over the entire surface of the shaft. In this way only a limited amount of frictional clamping effect is secured. Furthermore, if there is any inequality or irregularity in the shaft itself the pulley wabbles on the shaft.

My invention is intended to overcome these defects. To this end the bushing or pulley-hub, or both, are so formed that the bushing is clamped against the shaft more tightly at its ends than in the middle, so as to entirely prevent the rocking or wabbling of the pulley. Furthermore, the bushing is grooved both longitudinally and circumferentially to provide thinner points, which, in effect, form hinges, so that when the pulley-hub is clamped onto the same the bushing yields and clamps the shaft more firmly upon both longitudinal and circumferential lines, thus obtaining practically the effect of jaws or teeth, which bite onto the shaft. In this way a sufficient clamping effect can be secured to in most cases dispense with a keyway or set-screw. My bushing, however, is provided with both a keyway and set-screw, so that additional clamping effect can be gotten in cases where the same is found to be necessary.

In the accompanying drawings, Figure 1 is in part a side view and in part a section of a pulley having my invention applied thereto. Fig. 2 is an inside view of the hub-section. Fig. 3 is a similar view with a bushing-section in place. Fig. 4 is an enlarged view of the hub and bushing, showing the same partly in end view and partly in section. Fig. 5 is a longitudinal section through the hub and bushing, and Fig. 6 is a perspective view of a bushing-section.

My invention is applicable to any form of partible or sectional pulley. The drawings show a pulley formed of two similar sections, each comprising a rim member 1, provided at its ends with angle-brackets or ears 2 for receiving bolts 3 or similar securing means. The hub-sections 4 are provided with radially or outwardly projecting ears 5 for receiving the bolts 6 or other suitable securing means. These hub-sections are so formed that normally there is a slight space between the ears 5, so that by means of the bolts 6 the hub-sections can be clamped very tightly upon the bushing. The hub and rim sections are united by spokes 7, formed of metal rods having reduced end portions, which project through holes in the rim and hub sections and are upset therein.

The bushing is formed of two similar sections 9, each being a half-tube. Bushings with different thicknesses of walls are provided to be used to secure pulleys having the same interior diameter of hub to shafts of several sizes. The bushing-sections are inserted in the hub in the usual way and are of such size externally that the hub-sections are clamped tightly against the same by the tightening-bolts 6.

In order to secure the clamping on longitudinal lines, above referred to, the bushing-sections are each provided with a longitudinal groove, which may be a mere groove, as shown at 10, or may also form a keyway, as at 10$^a$, so that in case of exceptional strains on the pulley the same may be connected to the shaft by a key inserted in this keyway. For ordinary uses, however, such key is unnecessary. These grooves or keyways form portions of less rigidity than the body of the sections, so that when the hub-sections are clamped on the bushing-sections with great force the sections yield along these weakened portions, the latter, in effect, forming hinges, and said sections clamp the shaft 11 along four longitudinal lines, (indicated at 12.) The result is that the bushing grips the shaft practically by means of four jaws extending longitudinally of the shaft. Provision is also made for clamping the shaft more tightly at the ends of the bushing than at the middle. This is effected by providing the hub on its inner face with a groove or reduced portion 14, leaving end portions 15 of greater height, which alone bear against the ends of the bushing, so that the latter has great pressure exerted on its ends and practically no pressure on its central portion. As a consequence the ends are clamped tightly against the shaft, thus preventing center binding and the wabbling or rocking of the pulley on the shaft.

The same effect is secured by providing the bushing-sections with central circumferential grooves or reduced portions 16, which give the function of having the hub bear only on the end portion, even though the hub should not be provided with the internal groove 14, and also give the further function of weakening the bushing around its middle, so that it will more readily yield to permit its end portions being tightly clamped onto the shaft.

It will be understood that it is not necessary to groove both the hub and the bushing, although, if desired, this may be done. The grooves 14 and 16 are preferably located in the plane of the spokes 7, so as to provide a space for the burs or heads that are formed by upsetting the inner ends of the spokes.

To provide for all possible contingencies, one or more set-screws 18 are provided, threaded holes being formed in the hub-sections for the screws, the inner ends of which project loosely through holes 19, formed in the bushing-section and preferably projecting into the keyway 10ª. By means of such set-screw an additional clamping of the pulley on the shaft may be secured. When a key is used in the keyway, these set-screws may be used to clamp the key against the shaft or to prevent it working out if a wedge key is used.

The pulley hub and bushing described is simple of construction and insures clamping the pulley tightly onto the shaft upon both longitudinal and circumferential lines, so that for most purposes the key or set-screw can be dispensed with. The longitudinal grooving of the bushing-section also provides for keying and its circumferential grooving also takes care of the burs formed by upsetting the inner ends of the spoke, thus making it unnecessary to do any special finishing on the inner ends of the spokes.

What I claim is—

1. A sectional pulley and bushing comprising a partible hub, means for clamping the sections thereof together, spokes projecting through holes in said hub and upset at their inner ends, and a partible bushing fitting in said hub and provided with a circumferentially-reduced portion in the plane of the spokes, whereby clearance is provided for the upset spoke ends.

2. A sectional pulley and bushing comprising a partible hub, means for clamping the sections thereof together, spokes having their inner ends projecting through holes in said hub and upset at their inner ends, and a partible bushing fitting in said hub and having its sections provided with a longitudinal groove forming a weakened zone and also provided with a circumferentially-reduced portion in the plane of said spokes, whereby clearance for the upset ends of the spokes is provided and when the hub-sections are clamped onto the bushing-sections the latter yield along the weakened zones and clamp the shaft both longitudinally and circumferentially.

In testimony whereof I, the said JOSEPH A. KAPLAN, have hereunto set my hand.

JOSEPH A. KAPLAN.

Witnesses:
  ROBERT C. TOTTEN,
  EDNA L. WATKINS.